United States Patent Office 2,748,135
Patented May 29, 1956

2,748,135

INTERMEDIATES FOR THE SYNTHESIS OF PYRIDOXINE

Reuben G. Jones, Indianapolis, Ind., assignor to Eli Lilly and Company, Indianapolis, Ind., a corporation of Indiana No Drawing. Application April 29, 1954,
Serial No. 426,563

12 Claims. (Cl. 260—294.9)

This is a continuation-in-part of my co-pending applications Serial Nos. 368,810, 368,811 and 362,812 filed July 17, 1953, all of which are now abandoned.

This invention relates to novel organic compounds and to their preparation, and more particularly to novel compounds useful as intermediates in the synthesis of pyridoxine, and to the syntheses thereof.

The compounds and processes of this invention are represented by the following chemical equations in which R and $R_1$ represent the same or different lower alkyl radical, Ac represents an acyl radical of a lower aliphatic carboxylic acid, and McOX represents a metallic hypohalite.

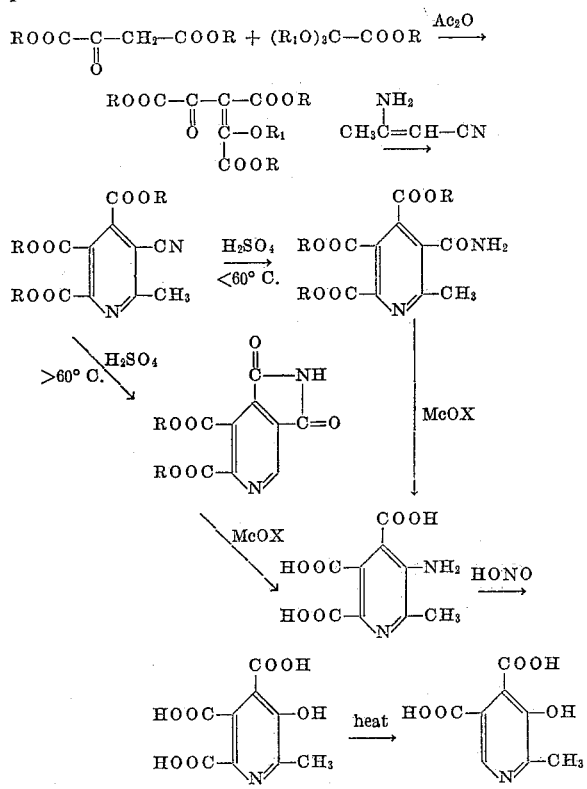

From the above equations it will be seen that an ester of oxalacetic acid is reacted with an ester of a trialkoxyacetic acid in the presence of a lower aliphatic acid anhydride to yield an ester of an α-keto-γ-alkoxyaconitic acid. This last compound is cyclized with β-aminocrotononitrile to produce a triester of 2-methyl-3-cyano-4,5,6-pyridinetricarboxylic acid. Treatment of the cyano ester with concentrated sulfuric acid converts the cyano group into an amide or an imide, depending upon the temperature at which the reaction is carried out.

If the treatment is carried out at a temperature below about 60° C. the reaction product is predominantly the amide, whereas a higher temperature favors the formation of the imide.

Hydrolysis of the ester groups and conversion of the amide (or imide) into an amino group is accomplished in a single step by reaction with a metal hypohalite. The 2-methyl-3-amino-4,5,6-pyridinetricarboxylic acid thus produced is converted to 2-methyl-3-hydroxy-4,5,6-pyridinetricarboxylic acid by treatment with nitrous acid, and the tricarboxylic acid is decarboxylated by heat to 2-methyl-3-hydroxy-4,5-pyridinedicarboxylic acid.

The dicarboxylic acid can be esterified and treated with lithium aluminum hydride to produce pyridoxine. A suitable method for the conversion is described in British Patent No. 629,450.

In the specific examples to follow, this invention is illustrated with particular reference to compounds in which R, $R_1$ and Ac represent respectively the ethyl, ethyl, and acetyl radicals, and in which McOX represents sodium hypochlorite. It is to be understood, however, that the invention is not limited to those specific radicals or compounds, but embraces equivalents thereof. This invention includes within its scope those esterifying radicals which are equivalent to lower alkyl radicals. The preferred lower alkyl radicals employed for R in the above formula are radicals having from 1 to 6 carbon atoms. This range of alkyl radical is likewise preferred for $R_1$. Thus, for example, the methyl, butyl and hexyl radicals are preferred, but other equivalent radicals include the β-methoxyethyl, octyl and benzyl esters of the α-keto-γ-methoxy-propoxy-, and amyloxyaconitic acid and the corresponding esters of the pyridine di- and tricarboxylic acids disclosed herein.

Moreover, the metal hypohalite can be other than the sodium hypochlorite disclosed in the example. Other hypohalites prepared from relatively strong metal hydroxides and one of the halogens can be used, illustrative examples of which include calcium hypobromite, potassium hypoiodite and the like.

The following specific examples set forth the presently preferred methods of preparing the compounds and carrying out the processes of this invention.

EXAMPLE 1

Ethyl α-keto-γ-ethoxyaconitate 220 g. (1 mol) of ethyl triethoxyacetate [prepared by the method of Anschutz Ann. 254, 3 (1899)], 188 g. (1 mol) of diethyl oxalacetate [prepared by the method in Beilstein, vol. 3, page 782], and 225 g. (2.2 mol) of pure acetic anhydride were mixed in a flask provided with an air reflux condenser, and the mixture was heated in an oil bath for one hour at about 120° C. and for about eight hours at about 140° C. The ethyl acetate formed during the course of the reaction was allowed to distill through the condenser. The residual reaction product was distilled under reduced pressure. A forerun consisting of acetic acid, acetic anhydride, ethyl oxalate and unchanged ethyl oxalacetate was obtained, followed by the distillation of ethyl α-keto-γ-ethoxyaconitate which distilled at a temperature of 154–156° C. at a pressure of about 0.3 mm. of mercury. The refractive index and density were as follows: $n_D^{25}=1.4697$; $d_{26}^{26}=1.1556$. The yield was about 180 g. Analysis showed the presence of 52.90 percent carbon and 6.40 percent hydrogen as compared with the calculated values of 53.16 percent carbon and 6.37 percent hydrogen.

EXAMPLE 2

Triethyl 2-methyl-3-cyano-4,5,6-pyridinetricarboxylate

To 64 g. (0.2 mol) of ethyl α-keto-γ-ethoxyaconitate were added 20 g. (0.24 mol) of β-aminocrotononitrile.

The mixture was stirred, and the β-aminocrotononitrile gradually dissolved with the occurrence of a mold exothermic reaction. The temperature of the reaction mixture was maintained at about 40–60° C. by occasional cooling in an ice bath. After the reaction had proceeded for about 15 minutes at 40–60° C. the mixture was heated at about 90° C. for about one hour. The reaction mixture was cooled and 100 ml. of ether were added. The ethereal solution was separated and washed with dilute sodium carbonate solutions and water, and was dried over anhydrous magnesium sulfate. The ether was removed in vacuo, and the residual liquid consisting of triethyl 2-methyl-3-cyano-4,5,6-pyridinetricarboxylate was purified by distillation in high vacuum. It boiled at about 161° C. at pressure of 0.2 mm. of mercury. The refractive index and density were as follows: $n_D^{25}=1.5028$, $d_{26}^{26}=1.1863$. The yield obtained from the reaction was about 75 percent. Analysis showed the presence of 57.2 percent carbon, 5.81 percent hydrogen and 8.23 percent nitrogen, as compared with the calculated values of 57.48 percent carbon, 5.43 percent hydrogen and 8.38 percent nitrogen.

EXAMPLE 3

*Triethyl 2-methyl-3-carboxamido-4,5,6-pyridinetricarboxylate*

To 50 g. (0.15 mol) of triethyl 2-methyl-3-cyano-4,5,6-pyridinetricarboxylate contained in a flask cooled in an ice bath, were added 100 ml. of 97 percent sulfuric acid precooled to about 10° C. During the addition of the sulfuric acid the flask was well shaken while being cooled in the ice bath so that the temperature of the reaction mixture did not rise above 40° C. The mixture was maintained at a temperature of about 25–40° C. for one hour, and was then poured over 100 g. of chipped ice. The aqueous mixture was immediately extracted with two 400 ml. portions of ethyl acetate. The ethyl acetate extract was washed with aqueous sodium bicarbonate solution, was dried over anhydrous magnesium sulfate, and was evaporated to dryness in vacuo. The white, crystalline residue consisting of triethyl 2-methyl-3-carboxamido-4,5,6-pyridine tricarboxylate was washed with petroleum ether and dried in air. After purification by recrystallization from a mixture of ethyl acetate and petroleum ether, it melted at about 117–117.5° C. It was obtained in a yield of about 47 g. (89 percent of theory). Analysis showed the presence of 54.53 percent carbon, 5.48 percent hydrogen and 8.12 percent nitrogen as compared with the calculated value of 54.54 percent carbon, 5.72 percent hydrogen and 7.95 percent nitrogen.

EXAMPLE 4

*Diethyl 2-methyl-3,4-carboximido-5,6-pyridine-dicarboxylate*

To 13.5 g. (0.04 mol) of triethyl 2-methyl-3-cyano-4,5,6-pyridine tricarboxylate were added 35 ml. of 97 percent sulfuric acid, and the mixture was thoroughly stirred until a solution was obtained. The solution was heated at about 85–90° C. for about 20 minutes, and was then cooled and poured over 250 g. of chipped ice. The aqueous mixture was extracted with two 150 ml. portions of ethyl acetate. The ethyl acetate extract was washed with aqueous sodium bicarbonate solution, was dried over anhydrous magnesium sulfate, and evaporated in vacuo leaving a residue of 8.5 g. of crystalline diethyl 2-methyl-3,4-carboximido-5,6-pyridinedicarboxylate which after recrystallization from a mixture of benzene and petroleum ether melted at about 145–146° C. Analysis showed the presence of 54.95 percent carbon, 4.76 percent hydrogen, and 9.53 percent nitrogen as compared with the calculated values of 54.9 percent carbon, 4.61 percent hydrogen and 9.15 percent nitrogen.

EXAMPLE 5

*2-methyl-3-amino-4,5,6-pyridinetricarboxylic acid*

To a cold solution of sodium hydroxide prepared by dissolving 40 g. of sodium hydroxide in 40 ml. of water were added 90 g. of ice, and chlorine gas was passed into the solution until its weight had increased by about 10.3 g. (0.145 mol of chlorine). An additional amount of 150 g. of ice was added, and 45 g. (0.125 mols) of triethyl 2-methyl-3-carboxamido-4,5,6-pyridine tricarboxylate were added to the mixture, with stirring. After a few minutes all of the pyridine compound had dissolved. The solution was allowed to warm to room temperature over a period of about 30 minutes and was then heated to about 80° C. for about 30 minutes. The solution was acidified to about pH 2 by the addition of 60 ml. of 12 N hydrochloric acid, and the acidified mixture was cooled in the refrigerator for about 24 hours during which time a yellow, crystalline precipitate of 2 - methyl - 3 - amino - 4,5,6 - pyridinetricarboxylic acid dihydrate separated. The precipitate was filtered off, and slurried with about 50 ml. of ice water. The slurry was filtered and the precipitate washed sequentially with small portions of acetone and ether, and dried in air. 32 g. (90 percent of theory) of 2-methyl-3-amino-4,5,6-pyridinetricarboxylic acid dihydrate were obtained. Upon heating it decomposed over the range of about 188–190° C. Analysis showed the presence of 39.45 percent carbon, 4.60 percent hydrogen and 9.82 percent nitrogen as compared with the calculated values of 39.15 percent carbon, 4.35 percent hydrogen and 10.01 percent nitrogen.

EXAMPLE 6

*2-methyl-3-amino-4,5,6-pyridinetricarboxylic acid*

A solution of sodium hypochlorite was prepared from 12 g. of sodium hydroxide, 75 g. of ice and 3.2 g. of chlorine according to the procedure described in Example 5, and to that solution were added 12.2 g. (0.02 mol) of diethyl 2-methyl-3,4-carboximido-5,6-pyridinedicarboxylate. The reaction was carried out and the product was isolated and purified by the procedure described in Example 5. 9.4 g. (83 percent of theory) of 2-methyl-3-amino-4,5,6-pyridinetricarboxylic acid dihydrate were obtained.

EXAMPLE 7

*2-methyl-3-hydroxy-4,5-pyridinedicarboxylic acid*

27.5 g. (0.01 mol) of 2-methyl-3-amino-4,5,6-pyridinetricarboxylic acid dihydrate were dissolved in 250 ml. of 3-N-hydrochloric acid, the solution was heated to about 70° C. and a solution of 20 g. of sodium nitrite dissolved in 25 ml. of water was added dropwise with stirring over a period of about 30 minutes. During the addition of the sodium nitrite solution, nitrogen gas was evolved. The solution was evaporated to dryness in vacuo and to the residue consisting of sodium chloride and 2-methyl-3-hydroxy-4,5,6-pyridinetricarboxylic acid were added about 150 ml. of acetic anhydride. The mixture was refluxed for about 1½ hours during which time carbon dioxide was evolved and 2-methyl-3-hydroxy-4,5-pyridinedicarboxylic acid was produced. The reaction mixture was cooled, filtered, and evaporated in vacuo to a syrup. The syrup was taken up in 200 ml. of water and the aqueous solution was heated to boiling. The solution was then evaporated in vacuo to a volume of about 100 ml. and allowed to stand in the refrigerator. A crystalline precipitate of 2-methyl-3-hydroxy-4,5-pyridinedicarboxylic acid separated. It melted at about 258–259° C. The yield was 3.5 g.

EXAMPLE 8

*2-methyl-3-hydroxy-4,5,6-pyridinetricarboxylic acid*

20 g. (0.072 mol) of 2-methyl-3-amino-4,5,6-pyridinetricarboxylic acid dihydrate dissolved in 200 ml. of 3-N- hydrochloric acid were heated to about 70° C., the solution was treated with 15 g. of sodium nitrite added slowly in small portions with stirring over a period of about one half hour. Heating at 70° C. was continued for about 15 minutes after all the sodium nitrite had been added. The solution was evaporated to dryness in vacuo, and the residue consisting of a mixture of sodium chloride and 2-methyl-3-hydroxy-4,5,6-pyridinetricarboxylic acid was extracted with three 200 ml. portions of boiling acetone. The acetone extracts were combined, filtered, and evaporated with heating to a volume of about 50 ml. To the hot solution 200 ml. of benzene were added slowly. The mixture was heated to boiling and evaporated to a volume of about 150 ml. and cooled in a refrigerator. A white crystalline precipitate of 2-methyl-3-hydroxy-4,5,6-pyridinetricarboxylic acid melting at about 204–206° C., separated. Evaporation of the filtrate yielded an additional 3.5 g. of pyridinetricraboxylic acid. The total amount of 2-methyl-3-hydroxy-4,5,6-pyridinetricarboxylic acid was about 15 g. (86 percent of theory). Analysis showed the presence of 5.80 percent nitrogen as compared with the calculated amount of 5.89 percent.

I claim:

1. A method of preparing 2-methyl-3-hydroxy-4,5-pyridinedicarboxylic acid which comprises reacting a di-lower alkyl ester of oxalacetic acid with a trialkoxyacetic acid lower alkyl ester in the presence of an aliphatic carboxylic acid anhydride to yield a lower trialkyl ester of α-keto-γ-alkoxyaconitic acid, reacting said ester with β-aminocrotononitrile to produce a tri-lower alkyl ester of 2-methyl-3-cyano-4,5,6-pyridinetricarboxylic acid, reacting said pyridine compound sequentially with sulfuric acid and a metal hypohalite to produce 2-methyl-3-amino-4,5,6-pyridinetricarboxylic acid, reacting said amino compound with nitrous acid to produce 2-methyl-3-hydroxy-4,5,6-pyridinetricarboxylic acid, and heating the tricarboxylic acid to cause decarboxylation and the formation of 2-methyl-3-hydroxy-4,5-pyridinedicarboxylic acid.

2. The method of preparing 2-methyl-3-hydroxy-4,5-pyridinedicarboxylic acid, which comprises heating 2-methyl-3-hydroxy-4,5,6-pyridinetricarboxylic acid whereby decarboxylation takes place.

3. The method of preparing a lower trialkyl ester of α-keto-γ-alkoxyaconitic acid which comprises reacting a lower alkyl ester of oxalacetic acid with a lower alkyl ester of trialkoxyacetic acid in the presence of an aliphatic carboxylic acid anhydride.

4. The process of claim 3 in which the ester groups are ethyl groups.

5. The process of claim 3 in which the alkoxy groups in the ethyl trialkoxyacetate are ethoxy groups.

6. The process which comprises reacting a lower trialkyl ester of α-keto-γ-alkoxyaconitic acid with β-aminocrotononitrile to produce a lower trialkyl ester of 2-methyl-3-cyano-4,5,6-pyridinetricarboxylic acid.

7. A process according to claim 6 in which the lower trialkyl ester of α-keto-γ-alkoxyaconitic acid is the ethyl ester.

8. A lower trialkyl ester of an α-keto-γ-alkoxyaconitic acid.

9. Triethyl α-keto-γ-ethoxyaconitate.

10. A lower trialkyl ester of 2-methyl-3-cyano-4,5,6-pyridinetricarboxylic acid.

11. Triethyl 2 - methyl - 3 - cyano - 4,5,6 - pyridinetricarboxylate.

12. 2 - methyl - 3 - amino - 4,5,6 - pyridinetricarboxylic acid.

References Cited in the file of this patent

Elderfield: "Heterocyclic Compounds" vol. I, pp. 462–63, Wiley and Sons, N. Y. (1950).

Jones: JACS, 73:3684–86, 4380–83 and 5244–47 (1951).